Jan. 27, 1953     C. W. VOGT     2,626,544
APPARATUS FOR AND PROCESS OF MANUFACTURING ENWRAPMENTS
Filed July 29, 1948     7 Sheets-Sheet 1

INVENTOR
CLARENCE W. VOGT
BY Evans & McCoy
ATTORNEYS

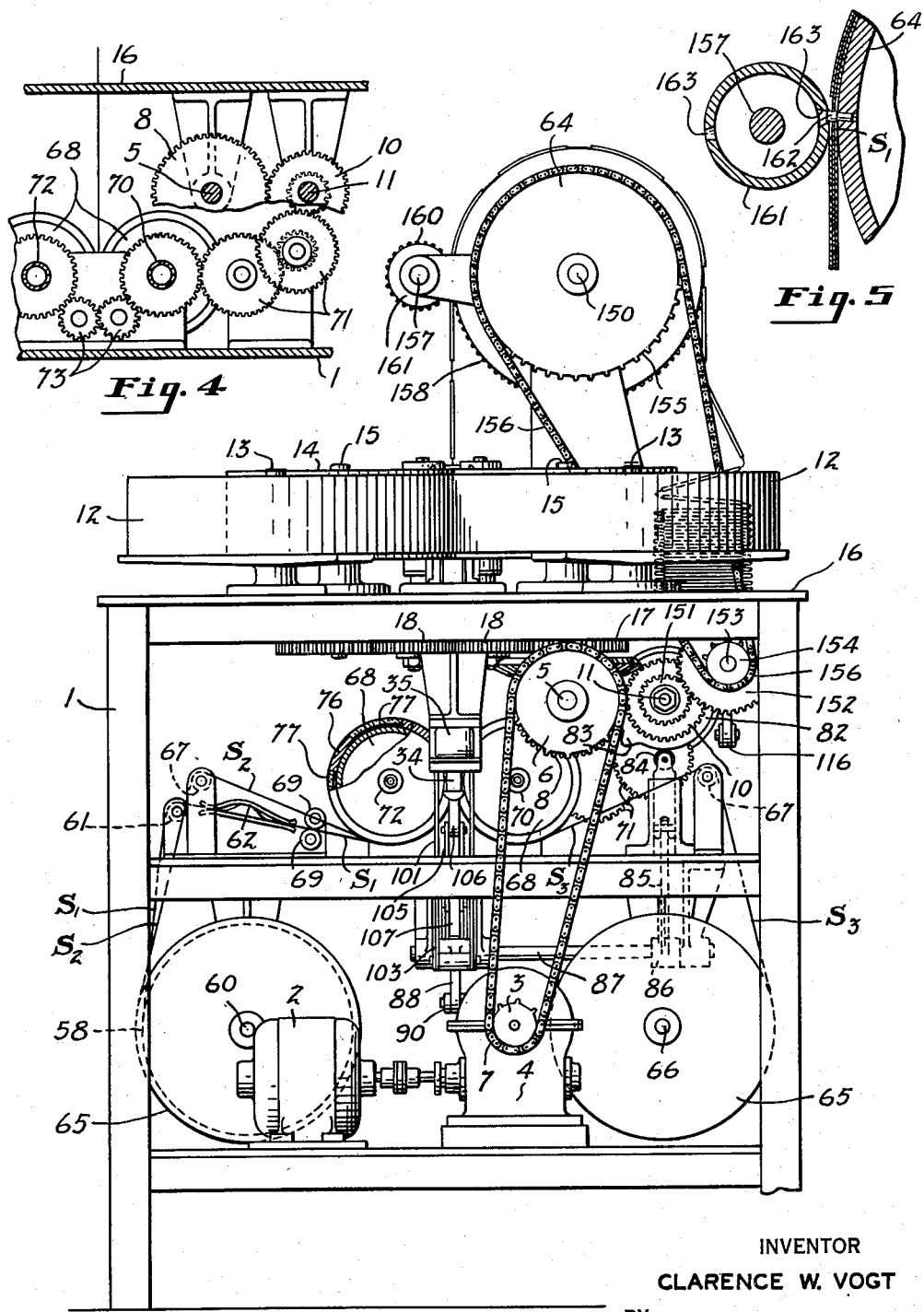

Jan. 27, 1953 C. W. VOGT 2,626,544
APPARATUS FOR AND PROCESS OF MANUFACTURING ENWRAPMENTS
Filed July 29, 1948 7 Sheets-Sheet 3

INVENTOR
CLARENCE W. VOGT
BY Evans & McCoy
ATTORNEYS

Jan. 27, 1953 C. W. VOGT 2,626,544
APPARATUS FOR AND PROCESS OF MANUFACTURING ENWRAPMENTS
Filed July 29, 1948 7 Sheets-Sheet 4
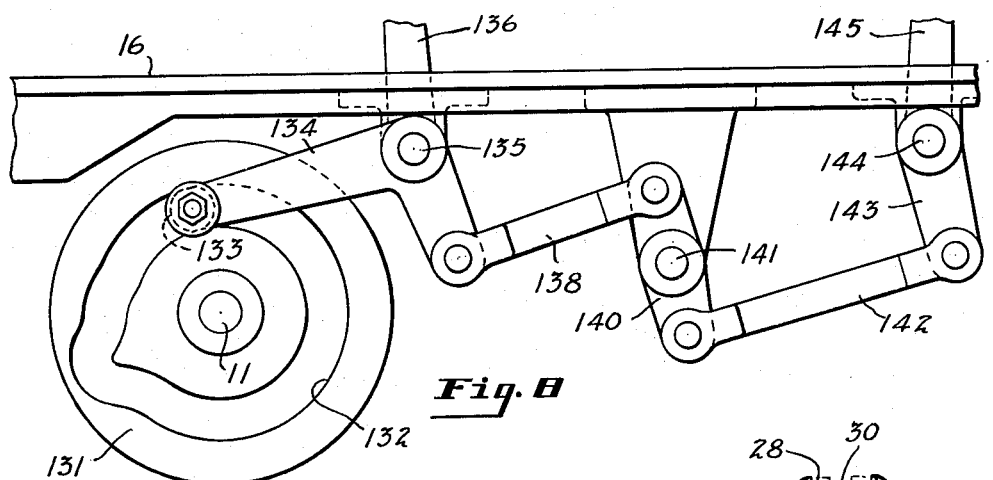
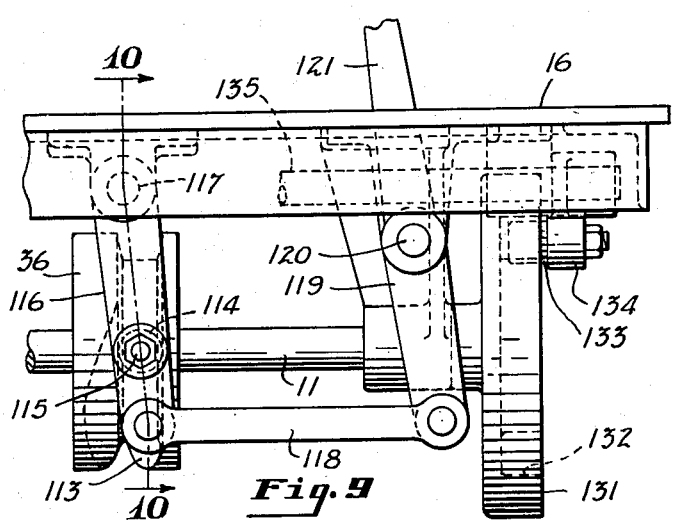
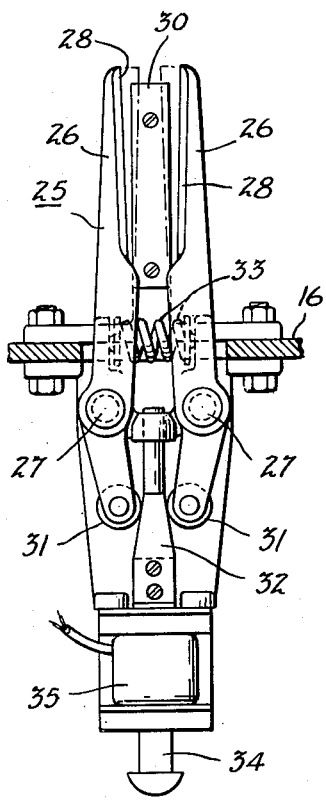
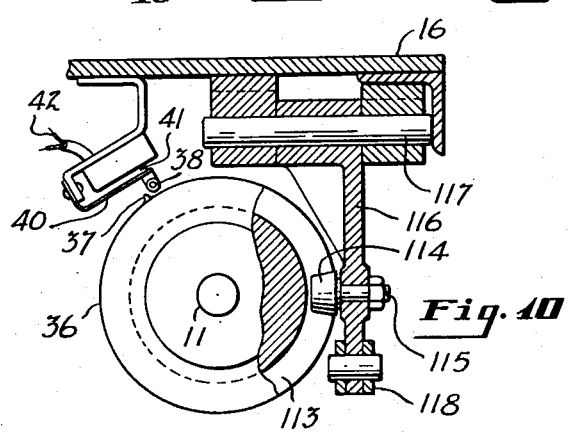
INVENTOR
CLARENCE W. VOGT
BY Evans & McCoy
ATTORNEYS Jan. 27, 1953 — C. W. VOGT — 2,626,544
APPARATUS FOR AND PROCESS OF MANUFACTURING ENWRAPMENTS
Filed July 29, 1948 — 7 Sheets-Sheet 5

INVENTOR
CLARENCE W. VOGT
BY Evans + McCoy
ATTORNEYS

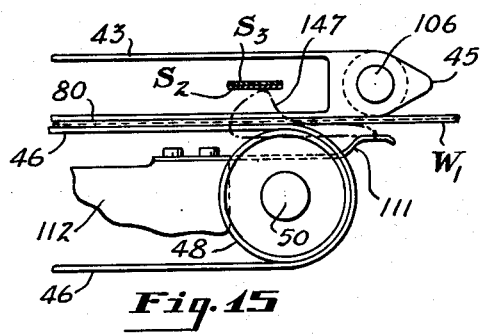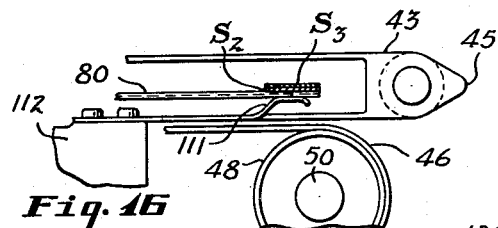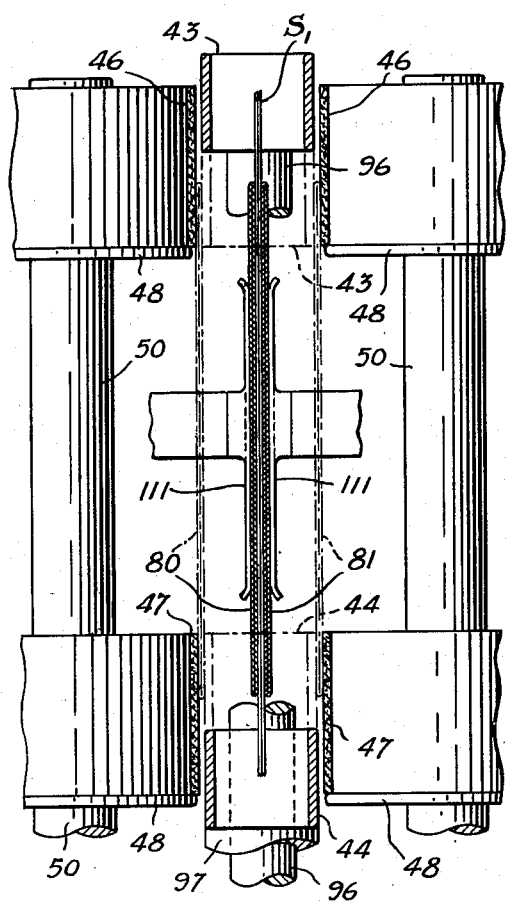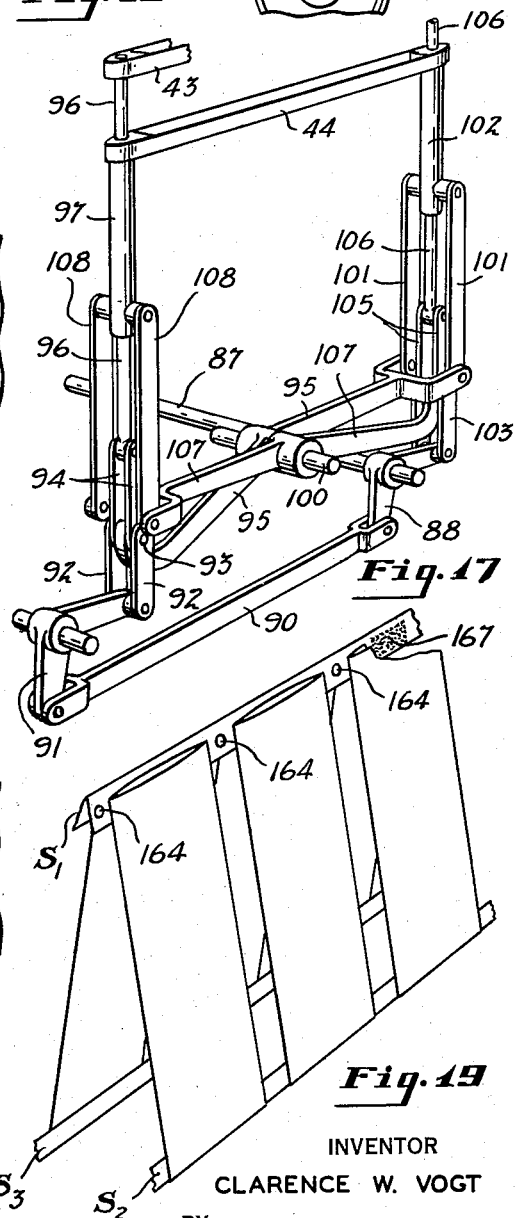

Patented Jan. 27, 1953

2,626,544

UNITED STATES PATENT OFFICE 2,626,544

APPARATUS FOR AND PROCESS OF MANUFACTURING ENWRAPMENTS

Clarence W. Vogt, Norwalk, Conn.

Application July 29, 1948, Serial No. 41,384

23 Claims. (Cl. 93—1)

This invention relates to an apparatus for and method of manufacturing enclosures or enwrapments for various articles or materials for shipment, storage or sale, and in particular relates to the assembling of a plurality of tubular enwrapments into a connected series whereby the enwrapments may be automatically formed, assembled and handled during filling and sealing thereof.

In the past, the packaging of materials in bags or other similar unitary enwrapments has been complicated and made more expensive due to the fact that it has been necessary to separately handle each enwrapment during the filling and closing thereof. It is, therefore, an object of the present invention to provide an apparatus for and a method of manufacturing enwrapments in which a supply of packaging material is fed and individual package units are assembled into a series of package units which may be readily handled by the use of automatic machinery at all times from the supply of the packaging material through filling and closing of the package units.

A further object is to provide an apparatus for and a method of manufacturing enwrapments which includes the feeding of tubular casing, the severing of the casing into lengths suitable for forming individual enwrapments, the sealing of an end of the severed casing to provide a baglike enwrapment and the assemblage of such enwrapments into a series which may be of infinite length to greatly facilitate handling thereof during packaging operations.

Another object is to provide an apparatus for and a method of manufacturing enwrapments in which tubular enwrapments are formed which are then connected in pairs and joined to provide a series of pairs of tubular enwrapments which may thereafter be handled so that the enwrapments are filled and sealed two at a time. Obviously this will create great savings in the cost of packaging materials due to the automatic handling of the packages and due to the handling, filling, etc. of two package units simultaneously.

A further object of the present invention is to provide an apparatus for and method of manufacturing enwrapments in which tubular enwrapments are assembled into a series of pairs and secured to elongated strips which may be of infinite length with certain of said strips being detachably connected to the members of the series for accomplishing certain purposes during the handling thereof, such as the opening of the mouths of the tubular enwrapments to receive the material to be packaged therein.

Another object is to provide an apparatus for and a method of manufacturing flexible enclosures which comprises assembling simultaneously two series of pairs of tubular enwrapments.

A still further object is to provide an apparatus for and a method of manufacturing enclosures or enwrapments which includes the assembling of tubular enwrapments into a series in which the elongated strips used to connect the tubular enwrapments may be provided with means such as slits, perforations or the like in order to facilitate accurate registry of the series and proper spacing of the enwrapments during handling thereof.

Other objects and advantages will become apparent from the following detailed description accompanied by the drawings, in which:

Fig. 3 is an enlarged end elevation illustrating further details of the apparatus shown in Figs. 1 and 2;

Fig. 4 is an enlarged fragmentary sectional view taken substantially on line 4—4 of Fig. 7;

Fig. 5 is an enlarged fragmentary sectional view of a detail of the mechanism located near the farther end of the apparatus as it is viewed in Fig. 3;

Fig. 8 is an enlarged fragmentary sectional view taken substantially on line 8—8 of Fig. 7 and illustrating a driving means for a portion of the mechanism;

Fig. 9 is an enlarged fragmentary sectional view taken substantially on line 9—9 of Fig. 6 to illustrate another portion of the driving mechanism;

Fig. 10 is an enlarged fragmentary sectional view taken substantially on line 10—10 of Fig. 9;

Fig. 11 is an enlarged elevational view of a mechanism for severing lengths of tubular enwrapments as they are fed from a suitable source of supply taken substantially on line 11—11 of Fig. 7;

Fig 15 is a further enlarged fragmentary plan view to illustrate the path of motion of one of the operating mechanisms;

Fig. 16 is a similar enlarged fragmentary elevation showing the same operating mechanism in a different portion of its operating cycle;

Fig. 17 is a perspective view of another portion of the operating mechanism to illustrate details of operation of such mechanism;

Fig. 18 is a further enlarged fragmentary elevational view similar to Fig. 13 but illustrating portions of the operating mechanism in a different position;

Fig. 19 is a perspective view of a series of enwrapments made in accordance with the present invention;

*General*

Figure 1:
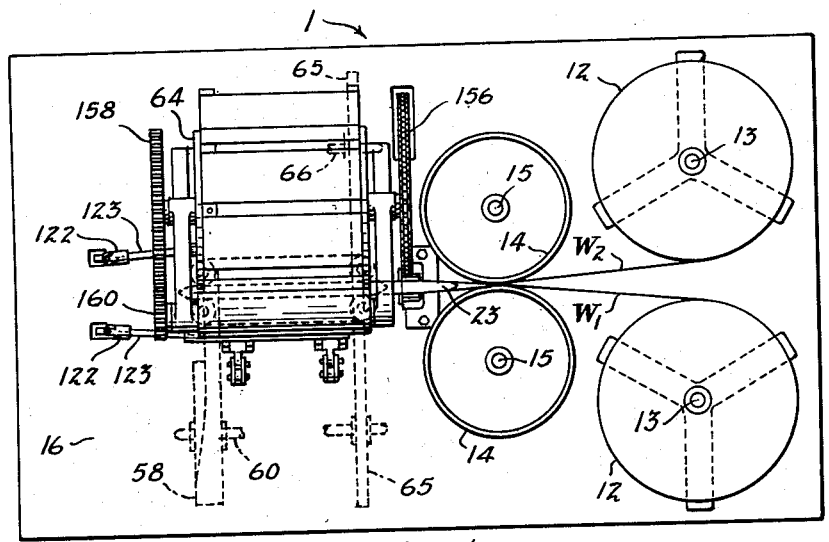
Figure 1 is a top plan view of one form of apparatus embodying the present invention.
Figure 2:
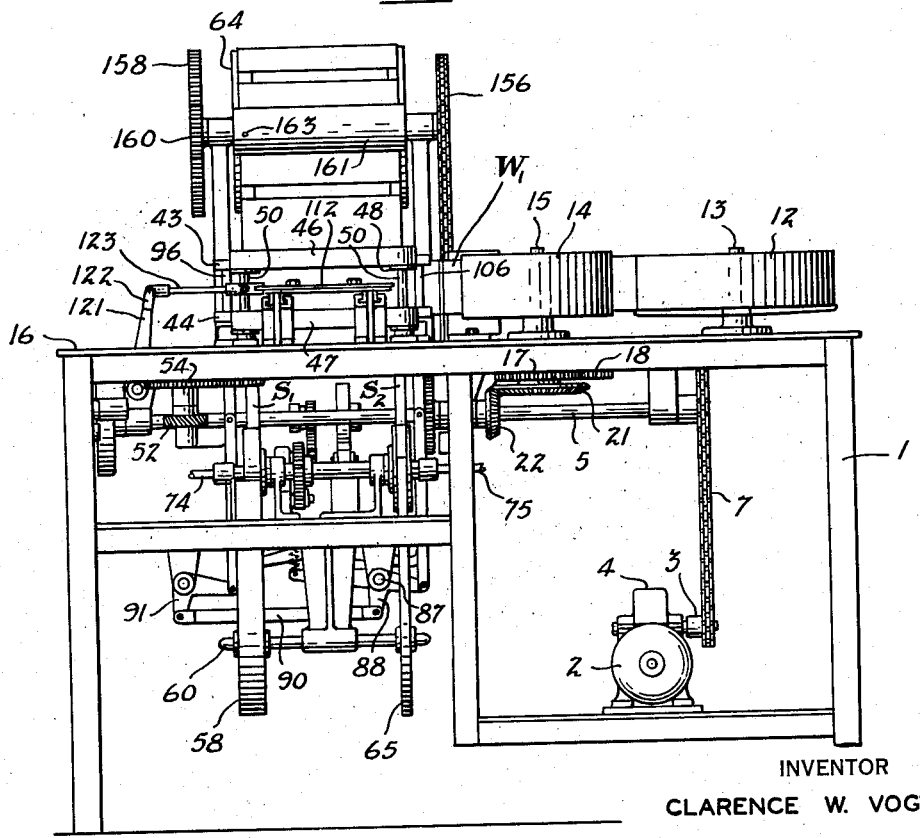
Fig. 2 is a side elevation of the mechanism shown in Fig. 1.

Referring to the drawings, Figs. 1, 2 and 3 show a plan view and side and end elevations respectively of one form of apparatus embodying the present invention. It may be seen that the apparatus is carried by a tablelike frame 1 and a suitable source of power such as motor 2 is mounted within the frame, driving a sprocket 3 through a gear box or speed reducer 4. A main drive shaft 5 is journaled in the frame 1 and carries a sprocket 6 with a chain 7 connecting the sprockets 3 and 6. As may be seen in Fig. 6, the main drive shaft 5 drives through a pair of gears 8 and 10, a camshaft 11 which is also journaled in the frame 1 and in addition to the gear 10, the camshaft 11 is provided with a number of cams, gears, etc. which may actuate in timed relation the several moving parts and thus carry out the operating cycle for which the machine has been designed.

The form of the invention illustrated in the drawings comprises an apparatus which will accomplish the following steps:

A. The feeding of two webs of packaging material in tubular form from two sources of supply.

B. The severing of two lengths of tubing simultaneously.

C. Positioning of the two severed lengths of tubing in spaced substantially parallel positions.

D. The feeding of elongated strips from suitable sources of supply in a direction transversely of the longitudinal axes of the severed lengths of tubing and between the two severed lengths of tubing.

E. Assembling and adhering the severed lengths of tubing to the elongated strips which serve to connect the pair of tubing lengths together and to make them one in a series of pairs of lengths of tubing carried by the strips.

F. The feeding of the series of pairs of severed lengths of tubing to a discharge position where they may be nested or manifolded in a stack or pile ready for transfer to a point of further use.

For ease of illustration the various portions of the machine will be described in accordance with and following the sequence outlined above.

*Feeding of the webs*

Since the present invention is primarily concerned with the assembling of tubular enwrapments it will be understood that such enwrapments may be previously formed prior to assemblage or as shown in the drawings the tubular enwrapments may be formed as a part of their assembly. For example, suitable tubular enwrapments may be formed by feeding a length of flattened tubular casing material in the direction of the longitudinal axis of the tubing, severing the tubing at a desired length and sealing an end thereof to form a tubular enwrapment or bag with one end which may be opened to receive the material to be packaged.

The material from which the enwrapments are formed may be of any material suitable for packaging. This includes a wide variety of natural or synthetic cellulosic and noncellulosic sheet materials, examples of which now widely used are waxed paper, parchment paper, kraft paper, cellulose or any plastic material which when fabricated in sheet form may advantageously be used for packaging.

Of particular interest is a tubular casing made of polyvinylidene chloride which is especially advantageous due to its high degree of transparency, its high strength and initial tear resistance even in very thin sheets, and its flexibility. It is also a superior enwrapment because of its relatively high melting point and its imperviousness to moisture, vapors, etc., which properties render it extremely desirable for packaging foods, medicines and many other similar materials. It has proven to be nontoxic and substantially inert to corrosive substances. Such a material is currently manufactured in tubular form, with the tubing being flattened or collapsed and being wound so that the axis of the tube assumes a spiral configuration.

Figs. 1 and 2 illustrate reels 12 of a tubular casing made of packaging material mounted on vertical spindles 13 carried by the frame 1 and from which the webs W-1 and W-2 may be withdrawn. The webs are withdrawn from the spindles 13 by a pair of feed rolls 14 which are mounted on vertical shafts 15 journaled in the frame 1 just above the table top 16. Beneath the table top 16 and keyed to the shafts 15 are a pair of gears 17. Each of the gears 17 meshes with one of a pair of intervening idler gears 18 which are journaled on stub shafts 20 carried on the underside of table top 16.

Figure 6:
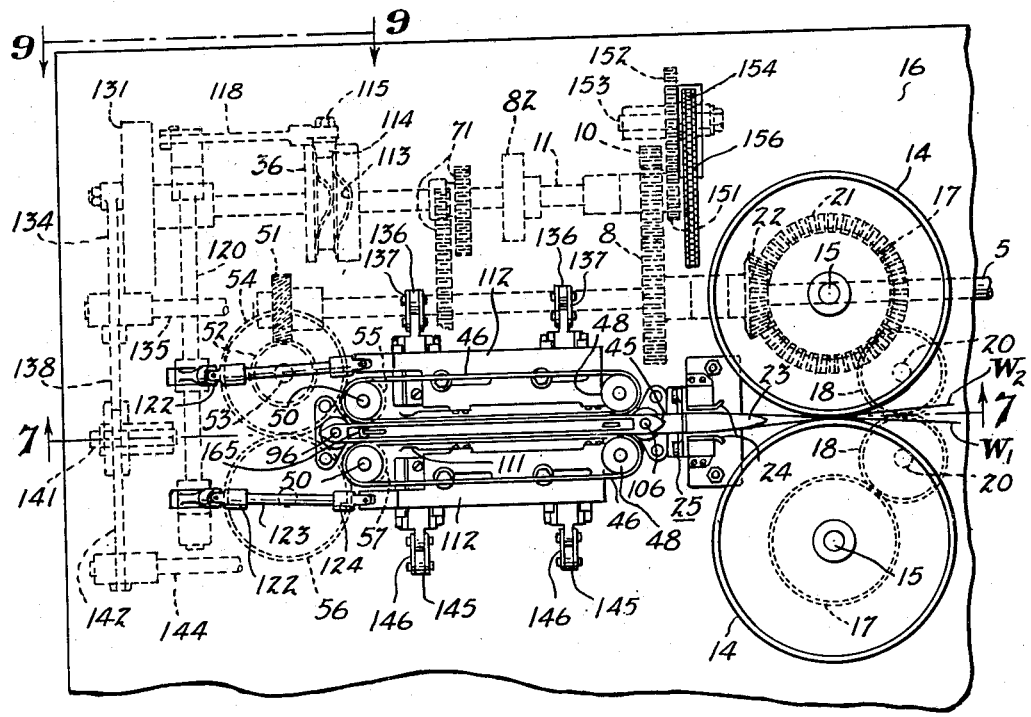
Fig. 6 is an enlarged fragmentary plan view with parts removed to illustrate details of how individual enwrapments may be assembled.
Figure 7:
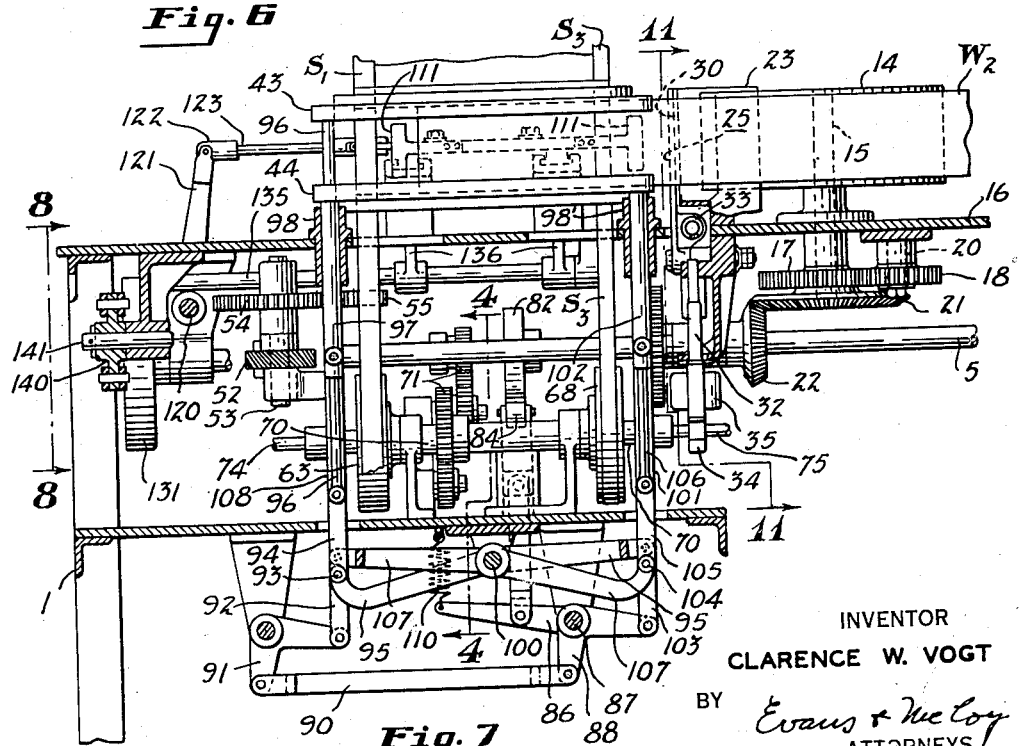
Fig. 7 is an enlarged sectional view taken substantially on line 7—7 of Fig. 6.

As may be seen from Figs. 6 and 7, one of the shafts 15 also carries a bevel gear 21 which meshes with and is driven by a bevel pinion 22 which is mounted for rotation with main drive shaft 5. Thus, rotation of the drive shaft will cause rotation of the feed rolls 14 in opposite directions from each other and in timed relation to the main drive shaft. If desired, the feed rolls 14 may have their peripheries covered with a suitable resilient material to insure adequate gripping of the webs W-1 and W-2 therebetween.

After passing through the feed rolls 14 the webs W-1 and W-2 are separated into spaced substantially parallel paths by a stationary separator 23 carried by the table top 16 and having a sharpened edge facing the point of engagement of the feed rolls to assist and guide the webs into their spaced paths. Outer side guides 24 also carried by the table top and best seen in Fig. 6 may be disposed in spaced relationship to the separator 23 to prevent too great a separation of the webs W-1 and W-2.

*Severing mechanism*

Figure 12:
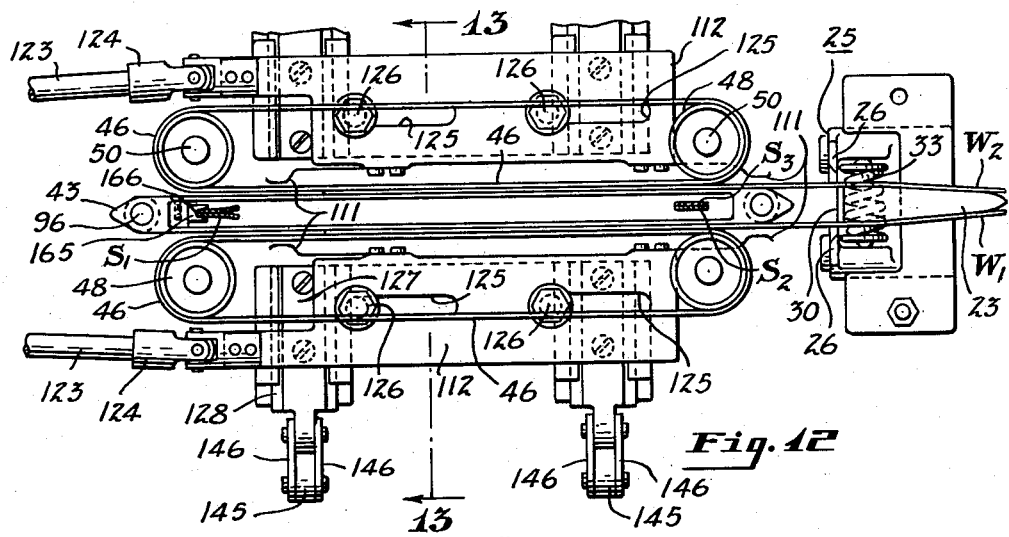
Fig. 12 is a further enlarged plan view with parts removed similar to Fig. 6.

After sufficient length of tubing has been fed through the spaced paths formed by the stationary separator 23 and outer side guides 24, the two webs W-1 and W-2 may be severed by any suitable mechanism. Figs. 12, 11 and 6 illustrate one form of severing mechanism, indicated generally by the numeral 25, which essentially comprises a pair of spaced movable shearing blades 26 pivotally mounted about pivots 27 carried by the table top 16, the blade 26 having cutting edges 28 disposed adjacent the path of webs W-1 and W-2. Cooperating with the shearing blades 26 is a stationary shear plate 30 which in the present instance comprises a plate secured vertically to the rear face of the separator 23 between the paths of the webs W-1 and W-2. The shearing blades 26 on the opposite side of their pivots 27 terminate in rollers 31. Disposed between the rollers 31 is a tapered block 32 which moves in a vertical reciprocating path acting to spread the rollers 31 when the block 32 is moved in upward direction (while looking at Fig. 11). Spreading of the rollers 31 causes the cutting edges 28 of the shearing blades 26 to swing in an arcuate path toward the stationary shear blade 30 and engage the webs W-1 and W-2 severing the same. As soon as the webs W-1 and W-2 are severed the tapered block 32 returns to the lowermost point in its path and the shearing blades 26 are returned to their open position by means of a compression spring 33 mounted between and acting upon the shearing blades 26, tending to separate them.

The movement of the tapered block 32 in a reciprocating path may be accomplished in any desired manner. Since this is a relatively quick short stroke reciprocation it is believed preferable to mount the tapered block 32 on a plunger 34 of a solenoid 35 which may be temporarily activated by an electric current to cause a quick movement of the plunger and the tapered block.

A switch suitable for obtaining a proper activation of the solenoid is illustrated in Fig. 10 which shows a rotary cam 36 mounted for rotation on the camshaft 11 and serving a purpose which will be described later. The cam 36, however, carries on its periphery a projection 37 which during rotation of the cam engages roller 38 carried by a leaf spring contact 40. During the brief instant that the projection 37 causes movement of the leaf spring contact 40 a contact is made between the leaf spring contact 40 and a stationary contact 41 which closes the circuit and results in a flow of electricity sufficient to activate the solenoid 35. Electric wires 42 shown in Fig. 10 are adapted to be connected to a suitable current source (not shown) which is also connected to the solenoid 35 so that upon closing of the contacts 41 and 40, activation of the solenoid will cause the plunger 34 and tapered block 32 to oscillate the shearing blades 26 and thus sever the webs W-1 and W-2.

Positioning of the webs

After the webs W-1 and W-2 are fed through their spaced parallel paths guided by the separator 23 and outer side guides 24, they advance into engagement with a back-up frame mechanism comprising upper and lower back-up frame members 43 and 44, respectively, which are provided with rounded end portions 45 facing in the direction of the advancing webs, as may be clearly seen in Figs. 6, 12, 15 and 16. Adjacent the back-up frame members 43 and 44 and on both sides thereof are upper and lower endless belts 46 and 47, respectively, which each travel around spaced pulleys 48.

The pulleys 48 are mounted on shafts 50 mounted for rotation in the table top 16. To drive the belts 46 and 47 the two shafts 50 appearing in the lefthand portions of Figs. 6 and 12 are driven. A helical gear 51 (Fig. 6) may be mounted for rotation on the main drive shaft 5 which meshes with and engages a helical gear 52 carried by stub shaft 53 suitably mounted for rotation with respect to the frame. Stub shaft 53 also carries for rotation a gear 54 which meshes with and drives gear 55 mounted for rotation on one of the shafts 50 located in the upper lefthand corner when looking at Figs. 6 and 12. At the same time gear 54 meshes with and engages a similar gear 56 which in turn meshes with a gear 57 mounted for rotation on one of the shafts 50 appearing in the lower lefthand corner looking at Figs. 6 and 12. This insures that the upper and lower endless belts 46 and 47 on both sides of the upper and lower back-up frame members 43 and 44 are driven in unison and in timed relation with the balance of the mechanism. An examination of Fig. 13 will show that the upper and lower endless belts 46 and 47 will engage the webs of tubular casing and feed them along while holding them against the upper and lower back-up members 43 and 44.

At a suitable time interval after the webs have been fed along the upper and lower back-up members 43 and 44 the severing mechanism, previously described, is actuated to cut predetermined lengths of tubular casing material from the webs. Continued movement of the upper and lower endless belts 46 and 47 will advance the severed lengths of tubing while holding them against the back-up frame members by such belts.

Strip feeding mechanism

The elongated strips or tapes which are to form the carrying mechanism for the series of lengths of tubing are then fed into position where they may be assembled with such lengths of tubular casing. These elongated strips may be of any suitable material and preferably are provided either continuously or at spaced intervals with any suitable adhesive material. For most purposes I have found it desirable to utilize an elongated paper strip or tape coated as desired with a suitable thermoplastic adhesive material which can be activated by heat to a tacky state so that slight pressure of the tape will cause it to adhere to the tubular casing material when it is positioned adjacent thereto. As the thermoplastic material cools and sets it causes a secure bond between the tape and the casing material. If a proper thermoplastic material be selected the connection of the tape and casing material may be detachable since reheating the connection will permit the tape to be readily peeled from the casing material. Also, thermoplastic adhesives may be utilized which are highly resistant to offsetting or transfer from the strip or tape.

In the form of the invention illustrated in Figs. 1 through 19 two tubular enwrapments or bags may be connected together at a point near their ends or mouths which are to be filled. I believe it desirable to make this connection by the use of a single endless tape folded back upon itself to make a V-shape in cross section with the outwardly facing surfaces thereof suitably provided with adhesive material. Also, two additional elongated strips may be utilized to connect the joined pairs of tubular enwrapment into a series. Each of these two additional strips or tapes may be secured to one tubular enwrapment of each pair in the region of its bottom or the extremity opposite to the mouth or end where it is connected with another tubular enwrapment. Figs. 1 and 3 illustrate the mechanism for feeding the elongated strip material.

A supply roll 58 (see Fig. 1) may be located transversely of the position of the severed lengths of tubing while they are held between the upper and lower belts 46 and 47 against the upper and lower back-up members 43 and 44 and opposite what will become the mouth end of the tubular enwrapment. The supply roll 58 is carried on a shaft 60 mounted for rotation in an extension of the frame member 1. A strip S-1 may be withdrawn from the supply roll and fed over an idler roll 61 as shown in Fig. 3 and through a folding and creasing mechanism 62 which doubles this strip over to assume its desired V-shaped position. To crease the folded strip, a pair of freely rotatable squeeze rolls may be applied thereto after the creaser 62 to insure that the strip will maintain its doubled-over position. These rolls 69 may be spring pressed or otherwise held into close engagement with each other to create the desired compression of the strip.

From the folding and creasing mechanism the strip S-1 is fed between a pair of feed rolls 63, one of which may be seen in Fig. 7. These feed rolls are disposed adjacent each other and rotate about spaced parallel shafts. They are driven in opposite directions and in addition to withdrawing the strip S-1 from the supply roll 58 the feed rolls 63 may be used to serve as activators for the thermoplastic material disposed on the strip S-1 by heating the peripheral surface of the feed rolls. Where spaced adhesive areas are desired, these may be obtained by heating spaced segments or sections of the periphery of the feed rolls and providing insulating material between such heated segments. The heating of the segments may be accomplished in any desired manner. For example, hot oil or other heat transfer medium may be circulated through hollow chambers in the feed rolls and heat will be transmitted through the noninsulated segments to the tape. From the feed rolls 63 the strip S-1 is advanced in an upward direction and passes through the open center of the upper and lower back-up frame members 43 and 44 between the spaced severed lengths of tubing and thence upwardly over a driven drum 64 as shown in Fig. 3.

Supply rolls 65 of elongated strip material which may have a width equal to the doubled width of the strip S-1 may be provided, one on each side of the two spaced paths of the tubing webs W-1 and W-2 (see Fig. 1). One of these supply rolls 65 may be mounted on an extension of the shaft 60 which also carries the supply roll 58. The other supply roll 65 is mounted on a shaft 66 disposed on the opposite side of the machine and carried by an extension of the frame 1. Webs S-2 and S-3 may be withdrawn from the supply rolls 65 and pass upwardly over idler rolls 67 (see Fig. 3) and then between feed rolls 68 which are also preferably hollow rolls having heated and insulated segments or sections to activate spaced adhesive areas on the strips S-2 and S-3.

The feed rolls 63 and 68 which feed the strips S-1, S-2 and S-3 may be driven in any desired manner, preferably in timed relation with the main drive shaft 5 of the machine. Fig. 4 illustrates one method by which this may be accomplished. In this figure the main drive shaft 5 is shown together with the gear 8 which drives the camshaft 11 through gear 10. One of each of the pairs of feed rolls 63 and 68 are mounted on a shaft 70 and this shaft together with its feed rolls are driven from the camshaft through a train of intermediate gears and shafts indicated by the numeral 71. The shaft 70 in turn drives shaft 72 which carries the other ones of each of the pairs of feed rolls 63 and 68 through intermediate gears indicated by the numeral 73.

The shafts 70 and 72 may be hollow and provided at one end with inlet pipes 74 and at their other ends with outlet pipes 75 for the passage of hot oil or other heat transfer medium from a suitable source of supply (not shown) to be transmitted to the hollow feed rolls 63 and 68, heating segments 76 on the periphery of the feed rolls, which in turn transfer heat to the strips S-1, S-2 and S-3 with the intervening portions of the strips not receiving the heat transfer due to the presence of the insulated segments indicated by the numeral 77 (Fig. 3).

From the feed rolls 68 the tapes S-2 and S-3 pass upwardly in parallel relation to the path of the strip S-1 through the hollow central portion of the back-up frame members 43 and 44 to a position which may be adjacent the ends of the severed lengths of tubular casing material opposite to the ends near which the strip S-1 is disposed. The strips S-2 and S-3 similar to strip S-1 also continue upwardly and pass over the driven drum 64 in Fig. 3.

*Assembly*

Thus it may be seen that while the severed lengths of tubing indicated by numerals 80 and 81 which have been severed from webs W-1 and W-2, respectively, and may best be seen in Figs. 13, 15, 16 and 18, are held against the back-up frame members 43 and 44 by the upper and lower belts 46 and 47, the elongated strips S-1, S-2 and S-3 are fed upwardly through the hollow center portion with adhesive areas spaced therealong due to the coating of the thermoplastic material which has been activated by heated segments 76 of the feed rolls 63 and 68.

In order to combine the severed lengths of tubing and the elongated strips, it is only necessary to separate the back-up frame members 43 and 44 so that the distance between them equals or exceeds the diameter of the flattened lengths of tubing 80 and 81 and cause the tubing lengths to move inwardly and adhere themselves to the adhesive areas on the strips. The completed product so produced is illustrated in Fig. 19 and it will be seen that by suitably closing an end of each of the pieces of severed tubing a chain or series of pairs of bags may be provided. This series or chain may therefore be carried or handled by the transversely disposed strips S-1, S-2 and S-3. One form of apparatus for accomplishing the assembling of the severed lengths of tubing and elongated strips will now be described.

The mechanism for causing separation of the back-up frame members 43 and 44 is driven from the camshaft 11. A rotary cam 82 is mounted for rotation on the camshaft 11 and has a projection 83 thereon. As the cam rotates the projection 83 contacts a roller follower 84 which activates push rod 85 mounted for reciprocation in a bracket secured to the frame. The push rod 85 is pivotally connected at its lower end to the lever 86 (Figs. 3 and 7) which is carried by rocker shaft 87 journaled in brackets carried by the frame.

As may be seen in Fig. 17, rocker shaft 87 extends over to a point approximately beneath the back-up frame members 43 and 44 and at this point carries a bell crank 88. One arm of the bell crank 88 is connected to a bifurcated end of a lever 90, which lever is pivotally connected at its other end to an arm of a corresponding bell crank 91 journaled on a stub shaft carried by a bracket mounted on the frame of the machine. The opposite arm of the bell crank 91 is pivotally connected to a pair of links 92 which are pivotally mounted on pin 93. Also mounted on the pin 93 are a pair of links 94 and between the two pairs of links one end of a rocker arm 95 is pivotally mounted. The links 94 extend upwardly and are pivotally mounted to the lower end of a push rod 96 which is connected at its upper end with the upper back-up frame member 43. The push rod 96 is telescoped for sliding movement within a tubular member 97 which is secured to the lower back-up frame member 44. The tubular member 97 is journaled in and supported for movement by a sleeve 98 secured to the table top 16 of the frame 1 (Fig. 7). Movement of the links 92 and 94 and the pin 93, which carries rocker arm 95 thereon, will cause rotary movement of the rocker arm 95 about a stub shaft 100 mounted on the frame of the machine. The opposite end of the rocker arm 95 is bifurcated and each of its bifurcated end portions is pivotally connected to one of a pair of links 101. The links 101 are pivotally connected at their opposite ends to a tubular member 102 which is similar to the tubular member 97 and secured to the opposite end of the lower back-up frame member 44. Tubular member 102 is journaled for movement in a sleeve 98' secured to the table top 16.

The arm of the bell crank 88 opposite the arm connected to the lever 90 is connected to a pair of links 103 which correspond to links 92 at the opposite end of the mechanism and are pivotally mounted at their opposite ends on a pin 104 which corresponds to the pin 93. Mounted between the links 103 and on the pin 104 are a pair of links 105 corresponding to the links 94 which are pivotally connected at their opposite ends with an end of a push rod 106. The push rod 106 corresponds to the push rod 96 and extends upwardly through the tubular member 102 in which it is journaled for sliding movement to connect to the upper back-up frame member 43. The pin 104 between the links 105 mounted thereon, passes through an end of a rocker arm 107 which corresponds to the rocker arm 95 and is journaled midway between its ends on the stub shaft 100. Similarly to the rocker arm 95, rocker arm 107 is bifurcated at its opposite end and each of the bifurcated end portions is pivotally connected to one of a pair of links 108 which extend upwardly and are pivotally connected to the tubular member 97 which is secured to the lower back-up frame member 44.

From the linkage described and as may best be seen in Fig. 17, movement of the rocker shaft 87 in a counterclockwise direction (when viewing Fig. 17) will cause movement of the bell crank 88 in a similar direction, thus activating the lever 90 toward the right and causing rotation of the bell crank 91 in a counterclockwise direction. Rotation of the bell crank 91 in a counterclockwise direction will raise the links 92 and 94 to cause an upward motion of the push rod 96, raising the upper backup frame member 43.

At the same time the counterclockwise rotation of the bell crank 88 will cause upward movement of the links 103 and 105 and push rod 106 to simultaneously raise the opposite end of the upper back-up frame member 43. Upward movement of the links 92 and 94, both of which are pinned by pin 93 to the end of the rocker arm 95, will cause the rocker arm 95 to pivot in a clockwise direction about stub shaft 100, lowering the bifurcated end of the rocker arm 95 which depresses the links 101 and pulls downwardly the tubular member 102 carrying the lower back-up frame member 44. Similarly the upward movement of the links 103 and 105 which are both connected to an end of the rocker arm 107 by pin 104 will rotate rocker arm 107 about stub shaft 100 in a counterclockwise direction, lowering its bifurcated end to which is connected links 108 and the tubular member 97 carrying the opposite end of the lower back-up frame member 44.

Thus each rotation of the cam 82 causes the projection 83 to engage the roller follower 84, depressing the push rod 85, thus rotating the lever 86 and the rocker shaft 87 to which it is connected in a counterclockwise direction when viewing Fig. 17, to obtain the simultaneous separating movement of the upper and lower back-up frame members 43 and 44. Lever 86 extends beyond its pivotal connection with the push rod 85 having a connection at its free end with a spring 110. The other end of the spring is connected to the frame 1 and after the projection 83 of the cam 82 has engaged the roller follower 84, the spring 110 causes the lever 86 and the rocker shaft 87 to rotate in a clockwise position when viewing Fig. 7, so that the associated mechanism will cause converging movement of the upper and lower back-up frame members 43 and 44, returning them to their normal position where they are ready to receive additional severed lengths of tubular casing.

Figure 13:
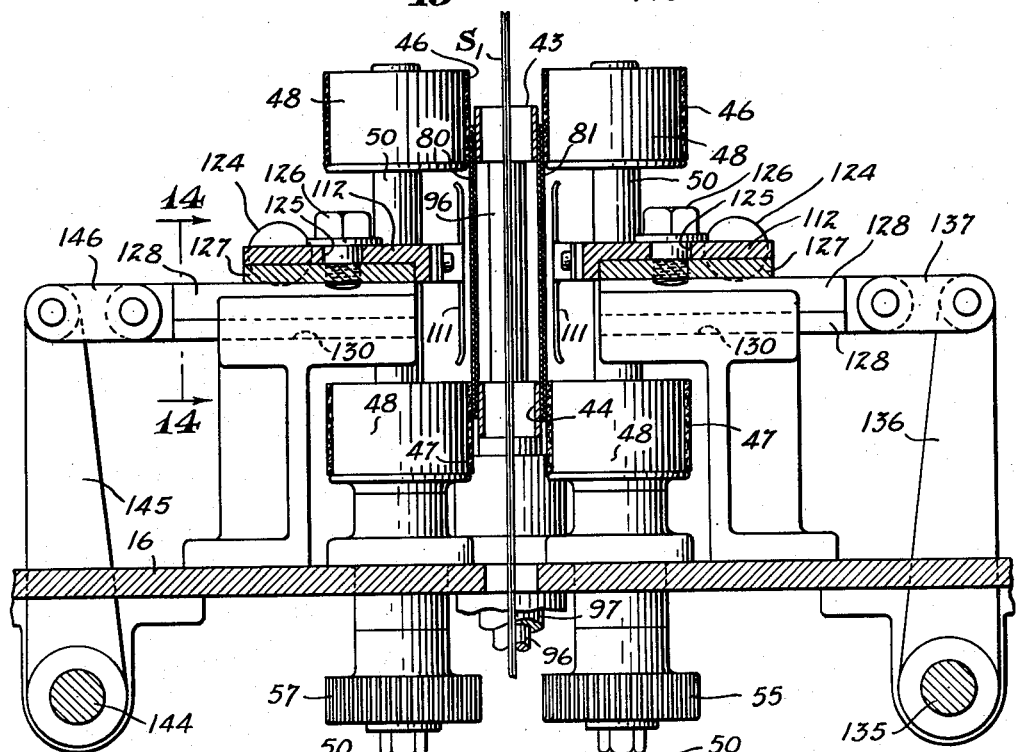
Fig. 13 is a fragmentary sectional view taken substantially on line 13—13 of Fig. 12.
Figure 14:
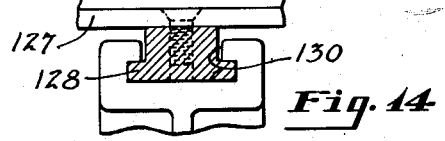
Fig. 14 is an enlarged fragmentary sectional view taken substantially on line 14—14 of Fig. 13.

The mechanism for assembling the severed lengths with the tapes at the instant the back-up frame members 43 and 44 are separated will now be described. Essentially this mechanism comprises a plurality of spring presser shoes 111 carried by slide members 112 disposed on opposite sides of the upper and lower backup members and between the upper and lower belts 46 and 47 (Figs. 12-14). The slide members 112 move in a longitudinal direction paralleling the axis of the tubing supported by belts 46 and 47 against the upper and lower back-up frame members 43 and 44. This longitudinal movement is obtained by mechanism shown in Figs. 9 and 10 as well as in Figs. 6 and 7.

The camshaft 11 carries the previously described rotary cam 36 which activated contacts 40 and 41 to energize the severing mechanism for severing the lengths of tubing from the webs W-1 and W-2. Cam 36 is provided with a peripheral track, indicated by the numeral 113, within which is mounted a frusto-conical follower 114. The follower 114 is freely rotatable and is utilized in order to provide a cam and follower movement which will have a minimum of friction and slippage. Follower 114 rotates about a pin 115 secured intermediate the ends of a lever 116. The lever 116 is pivotally mounted at one end on a shaft 117 journaled in brackets carried by the underside of the table top 16 of the frame 1. At its opposite end the lever 116 is pivotally mounted to a link 118 which is pivotally connected at its other end to an oscillating lever 119. The oscillating lever 119 may be mounted on and keyed to a rocker shaft 120 carried in journals secured to the underside of the table top 16. At locations spaced from the lever 119 and aligned with the slide members 112 are arms 121 which are mounted on rocker shaft 120 for oscillation therewith. These arms 121 extend upwardly and are pivotally connected through universal joints 122 to links 123 which are connected at their opposite ends through second universal joints 124 to the slide members 112.

Slide members 112 are flat plate-like members and are slotted as indicated by numeral 125. Mounted in the slots are bolts 126 which are threaded into similar slide or plate members 127. The bolts 126 and the slots 125 maintain the slide members 112 in alignment during their longitudinal motion.

The plate members 127 carrying the slide members 112 which in turn carry the shoes 111 are mounted for transverse movement with respect to the severed lengths 80 and 81 of tubing by being provided with runner members or slides 128 having a T-shaped cross section which slide in T-shaped slideways 130 carried by brackets mounted on the table top 16 (Fig. 14).

Members 127 are actuated in their transverse movement by a system of linkage, best shown in Fig. 8 as well as Figs. 6 and 7. The camshaft 11 is provided with a rotary cam 131 having a track 132 and a frusto-conical follower 133 similar to the follower 114 shown in Fig. 10. The follower 133 is pivotally mounted to an end of an arm of a bell crank 134 which is received on and keyed to a shaft 135 journaled in brackets carried by the underside of the table top 116. The shaft 135 extends longitudinally along the machine and at a point opposite the slides 128 carries arms 136 which are pivotally connected to the slides 128 through short links 137. Thus rotation of the camshaft 11 and the cam 131 causes oscillating movement of the bell crank 134, the shaft 135 and arms 136 to move, through links 137 and slide members 128, the plate members 127, which causes transverse movement of the leaf spring presser shoes 111 on one side only of the back-up frame members 43 and 44.

The presser shoes 111 on the opposite side of the upper and lower back-up frame members 43 and 44 are activated by linkage connecting to the opposite arm of the bell crank 134. As shown in Fig. 8, the opposite arm of the bell crank 134 is pivotally connected to a link 138 which in turn is pivotally connected at its opposite end to a rocker member 140 which oscillates on an idler shaft 141 journaled in brackets carried by the underside of the table top 16. The rocker member 140 on the side diametrically opposed from its connection with the link 138 is pivotally connected to a link 142 which at its opposite end is pivotally connected to a rocker arm 143 carried by shaft 144, which shaft corresponds to the shaft 135 and extends longitudinally of the machine to a point opposite the sliding plate members 127. The shaft 144 is journaled in brackets carried by the underside of the table top 16 and at a point opposite the members 127 is provided with arms 145 which correspond to the arms 136 and are connected to the slide members 128 through short links 146. Thus, as the camshaft rotates the presser shoes 111 on both sides of the upper and lower back-up frame members 43 and 44 are provided with a compound transverse and longitudinal movement.

Fig. 15 shows one of the leaf spring presser shoes 111 toward the infeed side of the machine disposed in its normal position adjacent the upper and lower back-up members 43 and 44. The dotted line indicated by the numeral 147 indicates the path of a point midway of the presser shoe 111 during a single cycle and it will be seen that it moves first inwardly to contact the severed length of tubular casing, then moves longitudinally for awhile, makes a sudden inward movement pressing the end of the severed length of tubular casing to the strip S–2, returning first outwardly and then longitudinally back to its starting point.

Fig. 16 is a view of the presser shoe 111 in its innermost position at the moment when it presses the severed length of tubular casing material 80 to the strip. Although not shown, the opposite presser shoe 111 is at the same time pressing the severed length of tubular casing material 81 to the strip S–3 and at the opposite end of the lengths of tubing presser shoes 111 are pressing the tubing lengths against the opposed faces of the tape S–1. This position of the presser shoes and the severed lengths of tubular casing material will be seen in Fig. 18, in which position the upper and lower back-up frame members are in their separated position, permitting the lengths of tubular casing 80 and 81 to move inwardly and be adhered to the adhesive areas of the strips S–1, S–2 and S–3. As soon as the presser shoes 111 withdraw and the back-up frame members 43 and 44 return to their converged position, indicated in dotted outline in Fig. 18, the strips S–1, S–2 and S–3 continue their upward travel, carrying the lengths of tubular casing 80 and 81 upwardly to permit new lengths of tubular casing to be fed inwardly against the back-up frame members 43 and 44 by the upper and lower belts 46 and 47.

*Completion and delivery*

As previously mentioned, the elongated strips S–1, S–2 and S–3, after passing through the hollow central portion of the back-up frame members 43 and 44, pass upwardly and around the driven drum 64 (see Fig. 3). This drum is mounted above the table top on a shaft 150 which is journaled in brackets which project upwardly and are mounted on the table top 16 of the frame 1. The camshaft 11 carries a gear 151 which meshes with a gear 152 carried by a stub shaft 153 journaled in brackets secured to the underside of the table top 16 of the frame 1 (Figs. 3 and 6). The stub shaft 153 also has a sprocket 154 mounted thereon for rotation. Shaft 150 carries a sprocket 155 and an endless chain 156 is mounted on and connects sprockets 154 and 155, thus driving the drum 64.

The same bracket which provides the journals for the shaft 150 extends sideways from the axis of the shaft 150 and journaled in this extension is a shaft 157. As may be seen in Fig. 1, the shaft 150 carries a gear 158 which meshes with a gear 160 carried by the shaft 157 to drive the same. The shaft 157 carries a pressure roller 161 which compresses the lengths of tubular casing material against the surface of the drum 64 to insure that they firmly adhere to the strips S–1, S–2 and S–3.

Further, as shown in Fig. 5, the surface of the drum 64 may be provided with a plurality of punch members 162 which register with openings 163 in the surface of the pressure roller 161. The punches 162 and openings 163 are preferably in alignment with the path of the strip S-1 and serve to perforate it in the spaces between the lengths of severed tubular casing so that the finished product as shown in Fig. 19 will be provided with a series of round holes or other perforations, slits or notches 164 to permit accurate registry of the finished product while it is being further handled, such as, for example, in feeding the same to a filling machine. The punches 162 also serve as pins in subsequent feeding of the strip S-1 as it passes around the periphery of the drum 64.

When it is desired that the assembled lengths of tubular casing material and strips be in the form of a series of bags it is desirable to seal an end of the tubular casing to form the bag. When the tubular casing material is a heat sealable material this may readily be done by providing a heated ring at the portion of the pressure roller 161 adjacent the portions of the lengths of tubular casing material where the seal is desired. Normally this would be near the end at which the lengths of tubular casing are secured to the strips S-2 and S-3 as it is generally believed preferable that the open or mouth ends of the bag members be joined for ease of filling.

As the strips S-1, S-2 and S-3 and the adhered lengths of tube leave the drum 64, they may be transferred to a reel and wound for storage until further use, or as illustrated in Fig. 3, they may be stacked or manifolded in a pile by successive folding of the strips S-1 and S-3 in opposite directions in the portions of such strips disposed between adjacent bag pairs.

Modified delivery portion

Figure 20:
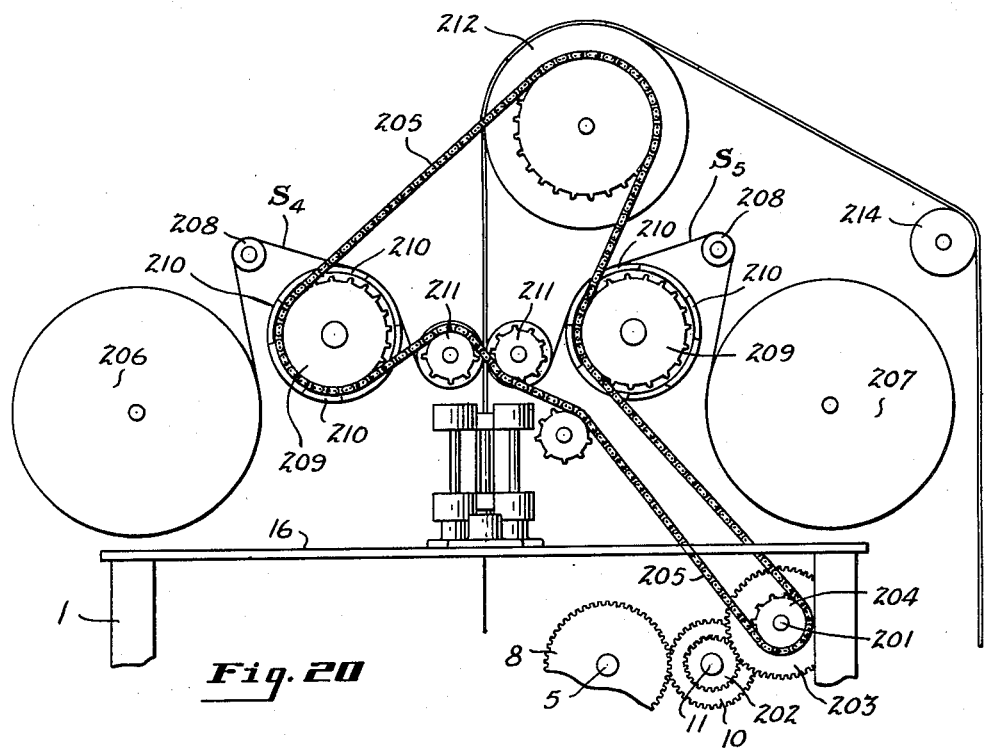
Fig. 20 is a semi-diagrammatic showing of an additional mechanism which may be utilized in conjunction with the mechanism shown in Figs. 1 through 19.

Fig. 20 illustrates in somewhat diagrammatic form a variation in the delivery portion of the apparatus for the purpose of producing a slightly modified chain of packaging material from that illustrated in Fig. 19. The modification principally comprises the addition of another pair of strips to the exterior of the lengths of tubing and this may be done at a point between the assembly of the tubes and strips as described in Figs. 1 to 18, but prior to the passage of the chain over the delivery drum. Fig. 20 shows a main drive shaft 5 which drives camshaft 11 through gears 8 and 10. The camshaft 11 drives an auxiliary shaft 201 through gears 202 and 203 mounted on shafts 11 and 201, respectively. The shaft 201 carries a sprocket 204 which in turn carries a chain 205 to drive the various rolls necessary for feeding the additional pair of elongated strips as well as the delivery drum.

Supply rolls 206 and 207 carry the strip material which is withdrawn therefrom over idler rolls 208. The strips S-4 and S-5 then pass over rolls 209, having spaced, heated segments or sections 210 so that if the strips S-4 and S-5 are coated with a thermoplastic adhesive material the heated segments 210 will activate the same. Strips S-4 and S-5 then pass under a pair of contacting feed rolls 211 which apply and press the strips to the chain of paired lengths of tubing at the position indicated in Fig. 21. The strips then pass on upwardly over delivery drum 212 where they may be provided with round holes or other perforations, slits or notches 213 as previously described in connection with the delivery drum 64 in Figs. 3 and 5. Upon leaving the delivery drum 212, the assembled chain may then pass over an idler roll 214 to suitable reeling or manifolding mechanism so that it can be placed in condition for storage until further use or sold as an article of commerce.

Figure 21:
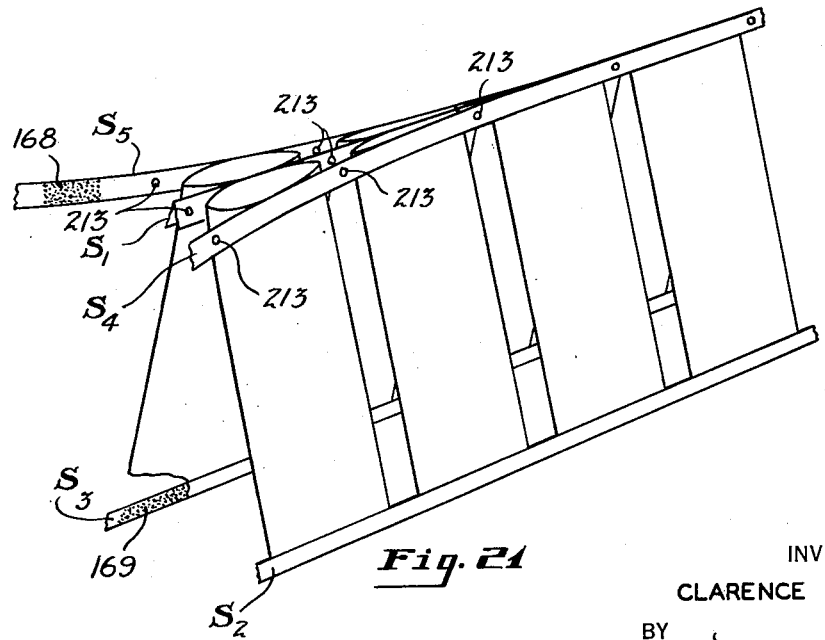
Fig. 21 is a perspective view of the product which may be made by the use of the mechanism shown in Fig. 20.

It will be noted that the form of article embodying the present invention and illustrated in Fig. 19 shows the strip S-1 as being above the ends of the lengths of tubing forming the bags or enwrapments, whereas in the form of article shown in Fig. 21, the tubing end is flush with the edge of the strip S-1. When it is desired to produce the article shown in Fig. 19, accurate positioning of the tape and tubing end can be had for successive bags by providing a shield 165, as shown in Figs. 6 and 12. The shield 165 may be provided with a V-shaped notch or recess 166 and may be mounted in either or both of the back-up frame members 43 and 44 to prevent the tubing length from overlapping or being connected to the tape S-1 on those portions which are received within the notch or recess 166. If the tape S-1 has a continuous coating of thermoplastic material on both of its opposite faces, it may be desirable to use a shield (not shown), similar to the shield 165, on the heated feed rolls used to activate such adhesive material.

It has been found that when a film of polyvinylidene chloride is used to make the tubing of packaging material, it is preferable for the strips S-4 and S-5 to be flush with the edge of the tubing. This is advantageous in opening the tubing for filling it with the material to be packaged since tubing made of this material is not readily openable. Thus, when the chain or series illustrated in Fig. 21 is made, separation of the strips S-1, S-4 and S-5 will readily open the lengths of tubing connected therebetween.

It is also desirable, particularly in the case of packaging materials having high shrinkage upon the application of heat, to utilize a layer of the elongated strip material on both exterior faces of the tubing when accomplishing a seal. For example, in closing an end of the tubing to form the bottom of a bag, the elongated strip material may be fed in such position that it extends beyond the end of the length of tubing for a distance approximately half its width. Then by creasing the strip it can be folded around the end of the tubing and sealing accomplished therethrough. Apparatus for accomplishing this creasing and sealing could be similar to the creaser 62, squeeze rolls 69 and the heated feed rolls 68 shown in Fig. 3. A chain or series of bags having their bottoms sealed in this fashion is shown in Fig. 21. Tapes S-2 and S-3 have been folded over and tubing ends sealed therethrough. After such sealing the strip material may be removed, if desired, as has been previously described in connection with the use of a thermoplastic adhesive material.

It is also contemplated that by minor modifications the apparatus disclosed in the drawings may be utilized to provide simultaneously two identical chains or series of paired enwrapments similar to that shown in Fig. 21 and also similar to the chain disclosed in Figs. 12 and 13 of my copending application Serial No. 30,647, filed June 2, 1948. This may be done by feeding and severing lengths of tubing which are twice the length of the finished bag desired. A pair of strips identical to the strips S-2 and S-3 may be fed at the position and in place of the strip S-1. Also two additional strips, which may be of approximately twice the width of the strips S-2 and S-3, may be fed at the midway point of the tubing lengths between the back-up frames 43 and 44 and in substantially parallel arrangement with the strips S-2 and S-3. The central portions of the tubing lengths may be adhered to the additional pair of strips or tapes by extensions of the present presser shoes 111.

As the partially formed chains travel above the back-up frame members 43 and 44, circular slitting knives may then sever the double lengths of tubing at their midpoints and through the two widths of strip material disposed therebetween. Following the slitting another pair of elongated strips of approximately double width may be adhered to the outside of the assembled strips and tubing lengths with the slitting line disposed approximately at the midpoint of the double width strips (see Figs. 12 and 13 of the above-referred to copending application). Following this the two chains may be separated over a pair of drums similar to the drums 64 or 212, and if desired, each chain may be folded over on itself at the midpoint of the last applied double width strip, thus forming an article similar to that shown in Fig. 21. At any desired point the strips at the free ends of the tubing lengths could then be folded over and heat and pressure applied to seal the bottom of the tubing.

Although the present application shows the use of flattened tubing, it is to be understood that other forms of tubing could be fed and utilized equally well. For example, the side edges of the tubing may be infolded or pleated either as the tubing is withdrawn from the supply roll or prior to its being wound on a supply roll, so that the chain of bags formed by the present invention would be similar to the conventional gusseted bag now in commercial use. Such a type of bag is desirable since the infolds or pleats permit wider opening of the bag mouth, which may be of assistance in filling. Many other forms of tubing may also be utilized, such as, for example, a tubing which would form the bag shown in the Vogt et al. Patent No. 2,307,902.

It is generally believed preferable that the connection between the tubing and the elongated strips extends for a distance less than the full tubing width, especially when tubing which is not provided with infolds or pleats is used. As illustrated by Figs. 19 and 21, such a connection facilitates opening the mouth of the tubing for filling. For example, as shown in Fig. 19, the adhesive area on the opposite faces of the strip S-1 may have the approximate configuration indicated by the numeral 167. Similarly, looking at Fig. 21, the adhesive area on the strips S-4 and S-5 may be disposed in the area indicated by the numeral 168 on the strip S-5, which, it will be noted, is of a less extent than the diameter of the flattened tubing. Obviously where it is desired to utilize the elongated strip as reinforcement for sealing an end of the tubing, the adhesive may extend for the full width of the tubing, as indicated by numeral 169, which denotes adhesive on the elongated strip S-3 in Fig. 21.

It will be understood that the foregoing description of preferred embodiments of the invention is for the purpose of explanation and illustration and numerous variations and modifications may be made without departing from the spirit of the invention.

What I claim is.

1. A method of manufacturing connected enwrapments which comprises feeding a series of pairs of tubular enwrapments with the axes of each pair of tubular enwrapments in spaced substantially parallel arrangement, connecting adjacent portions of the members of said pairs together, and connecting each member of said pairs of tubular enwrapments to one of a pair of elongated strips while feeding said elongated strips in spaced substantially parallel arrangement with each other.

2. The method of manufacturing a series of enwrapments which comprises successively feeding spaced pairs of bag-like members, successively connecting adjacent portions of the members of each of said pairs together, successively connecting each of the members of each of said pairs to one of a pair of elongated strips disposed between said pairs of members, and successively securing each of the members of each of said pairs to one of a pair of spaced elongated strips disposed on opposite sides of each of said pair of members.

3. The method of making a series of enwrapments which comprises feeding pairs of spaced tubular enwrapments, connecting the enwrapments of each of said pairs together and into a series by a single enlongated strip extending between the enwrapments of each of said pairs and joining them in the region of an open end thereof, connecting an elongated strip to an enwrapment of each of said pairs in said series in a region near the opposite extremity of each of said enwrapments from said first-mentioned elongated strip, and connecting an elongated strip to each enwrapment of each of said pairs in the region of said open end of said enwrapments but at a location spaced from the connection of said enwrapments to said first-mentioned elongated strip.

4. The method of forming a series of wrappings, casings or the like which comprises feeding a pair of elongated webs of packaging material in the form of flattened tubular casings, severing substantially equal predetermined lengths of tubular casing from each of said webs, feeding an elongated strip between the pair of severed lengths of tubular casings held in spaced relation with their longitudinal axes disposed in substantially parallel relation, adhering said pair of severed lengths of tubular casing to oppositely directed faces of said elongated strip when said strip is arranged transversely of the tubular axes of said severed lengths of casing, advancing said elongated strip and adhering a second pair of severed lengths of tubular casing to said elongated strip to form a series of pairs of severed lengths of tubular casing secured together and in said series by said elongated strip.

5. The method of forming a series of wrappings, casings or the like which comprises feeding a pair of elongated webs of packaging material in the form of flattened tubular casings, severing substantially equal predetermined lengths of tubular casing from each of said webs, feeding an elongated strip between a pair of severed lengths of tubular casings held in spaced relation with their longitudinal axes disposed in substantially parallel relation, adhering said pair of severed lengths of tubular casing to opposite faces of said elongated strip when said strip is arranged transversely of the tubular axes of said severed lengths of casing, advancing said elongated strip, adhering a second pair of severed lengths of tubular casing to said elongated strip to form a series of pairs of severed lengths of tubular casing secured together and in said series by said elongated strip, and adhering a plurality of additional elongated strips to each of said pairs of severed lengths of tubular casing when said plurality of additional strips are disposed in spaced parallel relation with respect to said first mentioned elongated strip.

6. The method of forming a series of wrappings, casings or the like which comprises feeding a pair of elongated webs of packaging material in the form of flattened tubular casings, severing substantially equal predetermined lengths of tubular casing from each of said webs, feeding an elongated strip between a pair of severed lengths of tubular casings held in spaced relation with their longitudinal axes disposed in substantially parallel relation, adhering said pair of severed lengths of tubular casing to opposite faces of said elongated strip when said strip is arranged transversely of the tubular axes of said severed lengths of casing, advancing said elongated strip, adhering a second pair of severed lengths of tubular casing to said elongated strip to form a series of pairs of severed lengths of tubular casing secured together and in said series by said elongated strip, feeding a pair of elongated strips between each of said pairs of severed lengths of tubular casing in spaced parallel relation with respect to said first-mentioned elongated strip and adhering one of each of said pairs of severed lengths of tubular casing to one of each of said pair of elongated strips.

7. The method of forming a series of wrappings, casings or the like which comprises feeding a pair of elongated webs of packaging material in the form of flattened tubular casings, severing substantially equal predetermined lengths of tubular casing from each of said webs, feeding an elongated strip between a pair of severed lengths of tubular casings held in spaced relation with their longitudinal axes disposed in substantially parallel relation, adhering said pair of severed lengths of tubular casing to opposite faces of said elongated strip when said strip is arranged transversely of the tubular axes of said severed lengths of casing, advancing said elongated strip, adhering a second pair of severed lengths of tubular casing to said elongated strip to form a series of pairs of severed lengths of tubular casing secured together and in said series by said elongated strip, feeding a pair of elongated strips between each of said pairs of severed lengths of tubular casing in spaced parallel relation with respect to said first-mentioned elongated strip, adhering one of each of said pairs of severed lengths of tubular casing to one of each of said pair of elongated strips, feeding a second pair of elongated strips in spaced parallel relationship to said previously mentioned elongated strips and adhering an oppositely directed face of each of said pair of severed lengths of tubular casing to each of said second pair of elongated strips.

8. Apparatus for manufacturing a series of enwrapments which comprises mechanism for withdrawing flattened tubular casing material from a source of supply, feeding means for advancing said severed lengths of tubular casing to a first position, mechanism for withdrawing elongated strip material from a source of supply, means for causing spaced areas of said elongated strip material to become adhesive, mechanism for feeding said strip material to an assembly position, intermittently movable presser means at said assembly position to successively apply and adhere said lengths of tubing to adhesive areas at spaced intervals along said elongated strips, and means for sealing an end of each of said lengths whereby a connected series of enwrapments is provided for advancement to packaging machinery.

9. Apparatus for manufacturing a series of enwrapments which comprises mechanism for positioning a pair of spaced tubular enwrapments against a pair of intervening supporting members, feeding mechanism for feeding elongated strip material through openings in said supporting members between said pair of tubular enwrapments, mechanism to cause separation of said supporting members, and movable elements to engage said tubing lengths and move them into engagement with said strip material.

10. Apparatus for manufacturing a series of enwrapments which comprises mechanism for withdrawing flattened tubular casing material from a source of supply, cutting means for severing lengths of said tubular casing, feeding means for advancing a pair of said severed lengths of tubular casing to an assembly position with each pair of lengths of tubular casing material disposed in spaced relationship and the axes of said lengths of tubular casing disposed in general parallel position, mechanism for feeding elongated strip material between said pair of lengths of tubular casing in a direction transversely of the axes of said lengths of tubular casings and in the region of an end portion thereof, movable means for connecting end portions of said pair of lengths of tubular casing to said elongated strip material, and means for connecting additional elongated strip material to at least one member of said pair of lengths of tubular casing.

11. Apparatus for manufacturing connected enwrapments which comprises mechanism for feeding a series of pairs of tubular enwrapments to an assembly position, mechanism for feeding elongated strip material having adhesive areas on oppositely directed surfaces thereof between said pairs of tubular enwrapments and adjacent the mouth ends of said enwrapments, movable means for adhering said enwrapments to the adhesive areas of said elongated strip material, mechanism for feeding a pair of elongated strips in substantially parallel paths in spaced relationship with said first mentioned elongated strip material, and means for connecting each of said pair of elongated strips to a member of each of said pairs of tubular enwrapments at a point spaced from said first mentioned connection and in position to facilitate opening the mouths of said pairs of tubular enwrapments upon separation of said strips.

12. Apparatus for manufacturing connected enwrapments which comprises feed mechanism to successively advance pairs of tubular enwrapments to a position where they are supported in spaced relationship with their mouths adjacent each other, means for feeding elongated strip material between said pair of tubular enwrapments in the region of their mouths and extending in a direction transversely of the tubular axes of said pair of enwrapments, mechanism for feeding a pair of elongated strips in spaced substantially parallel arrangement with said elongated strip material and externally of said pair of tubular enwrapments in the region of their mouths, mechanism for feeding an additional pair of elongated strips between said pair of tubular enwrapments and in the region of their ends opposite their mouths, presser means for connecting said pair of tubular enwrapments with said elongated strip material and said pairs of elongated strips, and advancing means to advance said elongated strip material and said pairs of elongated strips to permit connection of the next succeeding pair of tubular enwrapments.

13. The method of manufacturing a connected sequence of enwrapments which comprises feeding tubular sheet material, severing unit lengths of said sheet material, feeding a first elongated strip in a direction transversely of the axis of each of said unit lengths, adhering end portions of each of said unit lengths to said first elongated strip at spaced intervals therealong, feeding a second elongated strip in a direction transversely of the axis of each of said unit lengths, adhering said second strip to an opposite wall of the aforesaid end portions of each of said severed unit lengths, and sealing the ends of each of said severed unit lengths remote from the strips thereby providing a sequence of spaced bags carried by said elongated strips and openable by spacing said strips.

14. The method of making packaging material in the form of a plurality of bags connected together in chained relationship and each having an open and a closed end which comprises feeding a web of packaging material in the form of a flattened tubular casing, severing lengths of said casing, feeding an elongated strip in a direction transversely of the axis of the severed length of said tubular casing and at a position adjacent the outermost end of the severed portion in the direction of advance of the tubular casing, adhering said severed lengths of casing to said elongated strip at spaced intervals therealong and at the aforesaid position of the severed portions with respect to the strip, and sealing the ends of each of said severed lengths of tubular casing remote from the position of the strip whereby a continuous series of spaced bags connected to an elongated strip is provided.

15. Apparatus for manufacturing a connected series of enwrapments for use in packaging which comprises feeding mechanism for successively feeding tubular enwrapments substantially endwise to a first position, means for feeding an elongated strip having adhesive areas thereon substantially crosswise of the direction of movement of said enwrapments to bring the strip and enwrapments into overlapping and spaced apart relation and movable presser mechanism to move the strip and enwrapments together to cause adherence of said enwrapments successively to the adhesive areas of said strip.

16. Apparatus for manufacturing a connected series of enwrapments for use in packaging which comprises feeding mechanism for advancing tubular enwrapments successively and substantially endwise to a first position, feeding mechanism for feeding elongated strip material substantially crosswise of the direction of movement of said enwrapments to bring the strip and enwrapments into overlapping and spaced apart relation, and means for moving the enwrapments from the first position into engagement with the strip material for connecting a wall portion of each of said enwrapments to said elongated strip material.

17. Apparatus for manufacturing a series of enwrapments which comprises mechanism for successively feeding pairs of tubular enwrapments substantially endwise and in side by side relation to a first position, each of said enwrapments having an open end, means supporting the pairs of enwrapments in spaced relationship with open ends adjacent each other, mechanism for feeding elongated strip material substantially crosswise of the direction of movement of said enwrapments to a point adjacent and between said open ends and in spaced relation thereto, and means for successively joining said pairs of tubular enwrapments to said elongated strip.

18. Apparatus for manufacturing a connected series of enwrapments which comprises mechanism for feeding pairs of tubular enwrapments substantially endwise to a first position, means to support the pairs of enwrapments in spaced relationship in the first position, mechanism for feeding an elongated strip having areas covered with an adhesive material substantially crosswise of the direction of movement of said enwrapments and between the spaced pairs and in spaced relation thereto in the first position, and means for moving the tubular enwrapments against the strip to adhere the same successively to the adhesive areas of said strip.

19. Apparatus for manufacturing a series of enwrapments which comprises mechanism for successively feeding pairs of tubular enwrapments to a first position, means supporting the enwrapments of each pair in spaced relationship with open ends thereof adjacent each other, mechanism for feeding elongated strip material in a path between the spaced enwrapments in the first position and adjacent said openable ends, means for moving the supporting means in opposite directions in parallel planes away from the first position, and means for moving the tubular enwrapments against said elongated strip.

20. Apparatus for manufacturing connected enwrapments which comprises endless belt for feeding a series of tubular enwrapments substantially endwise in one direction in a first plane successively to a first position, stationary support means over which the enwrapments are moved by the belt, mechanism for feeding elongated strip material in a second plane parallel to and in spaced relation to the first plane and in a direction substantially crosswise and at right angles to said direction of feed of the enwrapments to the first position, and means for connecting said enwrapments successively to said elongated strip material at spaced intervals therealong.

21. Apparatus for manufacturing a connected series of enwrapments which comprises mechanism for successively feeding tubular enwrapments substantially endwise to a first position, means for feeding an elongated strip having adhesive areas thereon substantially crosswise of the direction of movement of said enwrapments to bring the strip and enwrapments into overlapping and spaced apart relation, means in the plane of the strip to locate the strip positively with respect to the first position, and movable presser mechanism to move the enwrapment against the strip to cause the enwrapment to adhere to an adhesive area of the strip.

22. Apparatus for manufacturing connected enwrapments which comprises endless belt mechanism for feeding a series of tubular enwrapments in a first plane successively to a first position, stationary support means over which the enwrapments are moved by the belt, mechanism for feeding elongated strip material in a second plane parallel to and spaced from the first plane and in a direction at right angles to the direction of feed of the enwrapments to the first position, means for moving the stationary support away from the first position, and presser mechanism for moving the enwrapments against the strip material.

23. Apparatus for manufacturing connected enwrapments which comprises spaced endless belts for engaging and feeding a series of tubular enwrapments in a first plane successively to a first position, spaced stationary support means over which the enwrapments are moved by the belts, mechanism for feeding elongated strip material in a second plane parallel to and spaced from the first plane and in a direction at right angles to the direction of feed of the enwrapments to the first position, means for moving the support means in opposite directions in a plane parallel to the plane of the strip, and presser means to move the enwrapment against the strip.

CLARENCE W. VOGT.

REFERENCES CITED

The following references are of record in the file of this patent:

UNITED STATES PATENTS

| Number | Name | Date |
|---|---|---|
| 683,790 | Parmenter | Oct. 1, 1901 |
| 1,710,393 | Williams | Apr. 23, 1929 |
| 1,926,241 | Orr | Sept. 12, 1933 |
| 2,013,672 | Royal | Sept. 10, 1935 |
| 2,095,910 | Bergstein | Oct. 12, 1937 |
| 2,177,117 | Potdevin | Oct. 24, 1939 |
| 2,206,965 | Lakso | July 9, 1940 |
| 2,244,282 | Bergstein | June 3, 1941 |
| 2,257,465 | Higginbottom | Sept. 30, 1941 |
| 2,363,417 | Heywood | Nov. 21, 1944 |
| 2,449,776 | Hess | Sept. 21, 1948 |
| 2,486,759 | Pfeiffer | Nov. 1, 1949 |